United States Patent
Hamada et al.

(10) Patent No.: US 11,932,221 B2
(45) Date of Patent: Mar. 19, 2024

(54) METHOD FOR CONTROLLING AUTOMOBILE AND AUTOMOBILE SYSTEM

(71) Applicant: Mazda Motor Corporation, Hiroshima (JP)

(72) Inventors: Takashi Hamada, Aki-gun (JP); Yuma Nishijo, Aki-gun (JP); Kouichi Kojima, Aki-gun (JP); Yoshiyuki Yamashita, Aki-gun (JP); Shinya Kyusaka, Aki-gun (JP); Yuta Tsuji, Aki-gun (JP); Nobuhiro Nonaka, Aki-gun (JP); Daisuke Shimizu, Aki-gun (JP); Keigo Fukuda, Aki-gun (JP); Yasuhiro Nakashima, Aki-gun (JP); Taro Oike, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 324 days.

(21) Appl. No.: 17/482,436

(22) Filed: Sep. 23, 2021

(65) Prior Publication Data

US 2022/0105908 A1 Apr. 7, 2022

(30) Foreign Application Priority Data

Oct. 1, 2020 (JP) .................................. 2020-166775

(51) Int. Cl.
*B60T 7/14* (2006.01)
*B60T 7/08* (2006.01)
(Continued)

(52) U.S. Cl.
CPC ........ *B60T 7/14* (2013.01); *B60T 7/08* (2013.01); *B60T 17/20* (2013.01);
(Continued)

(58) Field of Classification Search
CPC .......... B60T 7/14; B60T 7/08; B60T 2220/02; B60T 17/20; B60W 2040/0818;
(Continued)

(56) References Cited

U.S. PATENT DOCUMENTS

2016/0104050 A1 * 4/2016 Bogner ................. B60W 40/08
701/1
2016/0144840 A1 * 5/2016 Pfeifer ..................... B60T 7/14
701/76

(Continued)

FOREIGN PATENT DOCUMENTS

DE 102010044024 A1 * 5/2012 .............. B60T 7/042
GB 2585927 A * 1/2021 .............. B60T 17/20
(Continued)

*Primary Examiner* — Keith J Frisby
(74) *Attorney, Agent, or Firm* — XSENSUS LLP

(57) ABSTRACT

A system and method control an automobile by decelerating the automobile at a first deceleration using a braking mechanism in response to detecting that a parking brake switch is turned on, a second deceleration which is smaller than the first deceleration, in response to not detecting that the parking brake switch is turned on and determining that the driver is incapacitated, and a third deceleration which is smaller than the first deceleration, in response to determining that an SOS switch is turned on, detecting that the parking brake switch is changed from on to off, and not determining that the driver is incapacitated.

15 Claims, 10 Drawing Sheets

(51) Int. Cl.
  *B60T 17/20* (2006.01)
  *B60W 40/08* (2012.01)
(52) U.S. Cl.
  CPC .. *B60T 2220/02* (2013.01); *B60W 2040/0818* (2013.01); *B60W 2540/26* (2013.01); *B60Y 2302/05* (2013.01)
(58) Field of Classification Search
  CPC ....... B60W 2540/18; B60W 2540/223; B60W 2540/26; B60W 2720/106; B60K 28/06; B60Y 2302/05
  USPC ............................................ 180/272; 701/70
  See application file for complete search history.

(56) References Cited

U.S. PATENT DOCUMENTS

| | | | |
|---|---|---|---|
| 2018/0134262 A1 | 5/2018 | Kurahashi et al. | |
| 2018/0362013 A1* | 12/2018 | Ungermann | ........ B60W 10/182 |
| 2021/0146897 A1* | 5/2021 | Mannherz | ................ B60T 8/36 |

FOREIGN PATENT DOCUMENTS

| | | | | |
|---|---|---|---|---|
| JP | 2009-166656 A | | 7/2009 | |
| JP | 2018-79707 A | | 5/2018 | |
| KR | 20170094173 A | * | 8/2017 | |
| WO | WO-2017129963 A1 | * | 8/2017 | ............. B60K 28/06 |

* cited by examiner

METHOD FOR CONTROLLING AUTOMOBILE AND AUTOMOBILE SYSTEM

CROSS-REFERENCE TO RELATED APPLICATION

The present application claims priority to Japanese application number 2020-166775 filed in the Japanese Patent Office on Oct. 1, 2020, the entire contents of each of which being incorporated herein by reference.

TECHNICAL FIELD

The present disclosure relates to braking control of an automobile when a driver becomes incapacitated.

BACKGROUND ART

There is a conventionally known technology for decelerating and stopping an automobile when a driver becomes incapacitated. Patent document 1 discloses an automobile stop control device that starts the deceleration of an automobile based on a determination of incapacitation when the accelerator is continuously off for a certain period of time or the detection of the depression of an emergency switch provided on the steering wheel by the driver. This automobile stop control device decelerates the automobile at the first deceleration when either accelerator-off for a certain period of time or depression of the emergency switch is detected or decelerates the automobile at the second deceleration, which is larger than the first deceleration, when both of these operations are detected.

In the control device described in patent document 1, when the driver loses consciousness with a foot on the accelerator pedal, the deceleration of the automobile does not start because the accelerator-off condition does not continue for a predetermined period of time, and so it is not determined that the driver is incapacitated, and the driver does not operate the emergency switch. In addition, since the emergency switch is disposed on the steering wheel, even if a passenger is present in the automobile, it is not easy for the passenger to operate the emergency switch.

Accordingly, positioning of the emergency switch at a position accessible to the passenger can be considered. In this case, use of an operation switch (EPB switch) for an electric parking brake (EPB) can be considered as disclosed in, for example, patent document 2 without newly providing an emergency switch. That is, when the EPB switch is turned on while the automobile runs, the hydraulic brake is operated and controlled based on an input from the EPB switch. With this structure, the passenger can easily perform an operation for decelerating the automobile.

PRIOR ART DOCUMENTS

Patent Documents

[Patent document 1] JP-A-2018-079707
[Patent document 2] JP-A-2009-166656

SUMMARY

Problem to be Solved

As recognized by the present inventors, in the related art, even if the driver is not determined to be incapacitated, the passenger can decelerate and stop the automobile by an operation of the EPB switch. However, since the EPB switch can only be turned on or off and can only decelerate the automobile at a set deceleration or release the brake, it is considered difficult to stop the automobile safely in accordance with the surrounding traffic conditions only by operating the EPB switch. Accordingly, there is room for improvement in the operation control of the hydraulic brake based on an operation of the EPB switch by the passenger when the driver is incapacitated.

Means for Solving the Problems

The inventors of the present application have studied reduction in the burden on the passenger in the operation control of the hydraulic brake based on an operation of an EPB switch by the passenger when the driver is incapacitated.

First, the inventors have considered that the passenger may select the best one from a plurality of decelerations using a plurality of switches including the EPB switch, which is only turned on or off, to decelerate the automobile. However, simply increasing the number of switches operated by the passenger in an emergency puts a heavy burden on the passenger. As a result of further studies and consideration, the inventors have further considered that an operation of the SOS switch is combined with an operation of the EPB switch so that the optimum one can be selected from the plurality of decelerations to set the system that has an SOS switch corresponding to the emergency switch disclosed in patent document 1 at a position accessible to the passenger and enters an emergency mode when the SOS switch is operated once.

A method for controlling an automobile according to a first aspect, which embodies this innovation, includes determining with circuitry whether a driver of an automobile is incapacitated; determining with the circuitry whether an SOS switch is turned on by an automobile occupant, the SOS switch being disposed at a position accessible to the automobile occupant; detecting with the circuitry an operation state set by the automobile occupant of a parking brake switch that operates a parking brake of the automobile; decelerating the automobile using a brake by a first deceleration amount under a first condition, the first condition occurring in response to a detection being made that the parking brake switch is turned on regardless of whether the driver is determined as being incapacitated and regardless of whether the SOS switch is turned on while the automobile runs; decelerating the automobile using the brake by a second deceleration amount that is smaller than the first deceleration amount under a second condition, the second condition being that the parking brake switch is not detected as turned on and the driver is determined as being incapacitated regardless of whether the SOS switch is determined as being on while the automobile runs; and decelerating the automobile using the brake by a third deceleration amount that is smaller than the first deceleration amount under a third condition, the third condition being that it is determined that the SOS switch is turned on, the parking brake switch is changed from on to off, and it is not determined that the driver is incapacitated while the automobile runs.

According to the first aspect, the automobile is decelerated at any of the first deceleration, the second deceleration, and the third deceleration in accordance with a determination about driver incapacitation, a determination SOS switch determination, and parking brake switch operation detection.

Here, the deceleration is the first order time differential value of the velocity of the automobile. The deceleration is the first order differential value of the velocity especially when the velocity of the automobile is gradually reduced and experiences a negative acceleration. The running automobile stops immediately when the deceleration is large and the running automobile stops after a lapse of a long period of time or after a travel of a long distance when the deceleration is small.

When the parking brake switch is operated, the automobile is decelerated at the first deceleration which is the largest regardless of the operation of the SOS switch in the first deceleration step. When the occupant turns on the parking brake switch, the intention of the occupant to stop the running automobile is clear and it can be inferred that the occupant attempts to stop the automobile in accordance with the surrounding traffic conditions because the occupant has turned on the parking brake switch. Since the automobile is decelerated at the relatively large first deceleration, the automobile is decelerated properly.

When the parking brake switch is no longer operated after the first deceleration, the deceleration of the automobile is stopped if the SOS switch is not operated. Occurrence of some kind of emergency cannot be determined and the driver is not determined to be incapacitated. Since the need for stopping the automobile cannot be determined in this case, the deceleration of the automobile is stopped.

When the SOS switch is operated, if the parking brake switch is no longer operated after the first deceleration, the automobile is decelerated at the third deceleration that is smaller than the first deceleration. When the SOS switch is operated, occurrence of some kind of emergency can be inferred. Preferably, the running automobile is stopped immediately. When the SOS switch is operated, even if the operation of the parking brake switch is stopped, the deceleration can be continued and the automobile will stop. The occupant can stop the running automobile properly. When the occupant has operated the SOS switch once (that is, even if the occupant does not continuously operate the SOS switch), it is sufficient that the occupant has operated the SOS switch. In addition, the SOS switch may be operated before or after the parking brake switch is operated.

As described above, the occupant other than the driver can select the deceleration suited to the surrounding traffic conditions and decelerate the automobile by using the SOS switch and the parking brake switch.

In addition, when the driver is determined to be incapacitated, the automobile is decelerated at the second deceleration, which is smaller than the first deceleration, without a switch operation by the occupant. Since the intention of the occupant to stop the automobile is not clear and/or the surrounding traffic conditions are not known, the system sets the deceleration to a relatively small value. The system can stop the running automobile properly. Here, the second deceleration and the third deceleration may be different from each other or the same as each other.

The driver incapacitation determination may include a head position measurement step of measuring a head position of the driver, a head position deviation calculation step of calculating a deviation between the head position of the driver at start of operation and a current head position of the driver, and a posture change determination step of determining that the driver is incapacitated when the deviation calculated in the head position deviation calculation step is not less than a threshold.

In the posture change determination step described above, it can be sensed that the posture of the driver has changed based on the deviation of the head position of the driver. With this, since it is possible to sense a posture change that is often seen when the driver is incapacitated and, in this case, it is possible to determine that the driver is incapacitated, the deceleration at the second deceleration in the second deceleration step can be performed more reliably even if the passenger does not operate the SOS switch or the parking brake switch.

In addition, the driver incapacitation determination step according to the first aspect may include a steering torque detection step of detecting torsion deformation of a steering shaft of the automobile, and a steering operation determination step of determining that the driver is incapacitated when a state in which the torsion deformation of the steering shaft is less than a threshold in the steering torque detection step continues for a certain period of time.

In the steering operation determination step described above, a non-operation state of the steering can be sensed based on the torsion deformation of the steering shaft that accompanies a steering operation. With this, even if the driver loses consciousness while keeping the appropriate posture, it is possible to sense that the non-operation state of the steering has continued for a certain period of time and determine that the driver is incapacitated, so the deceleration at the second deceleration in the second deceleration step can be performed more reliably even if the passenger does not operate the SOS switch or the parking brake switch.

In addition, the driver incapacitation determination step according to the first aspect may include a driver eye opening degree measurement step of measuring an eye opening degree of the driver, and a driver consciousness determination step of determining that the driver is incapacitated when a ratio of an eye opening time within a certain period of time is less than a predetermined ratio based on the eye opening degree measured in the driver eye opening degree measurement step.

In the driver consciousness determination step described above, it can be sensed that the driver loses consciousness based on the opening degree of the eyes of the driver. With this, it can be sensed that the driver is in the unconsciousness state and that the driver is incapacitated when the driver is unconscious but some driving signal continues to be sent to the automobile during, for example, sleep-deprived zigzag driving. Accordingly, the deceleration at the second deceleration in the second deceleration step can be performed more reliably even if the passenger does not operate the SOS switch or the parking brake switch.

An automobile system according to a second aspect that performs the method for controlling an automobile according to the first aspect includes a driver incapacitation determination system that outputs a driver incapacitation signal measured to determine whether a driver of an automobile is incapacitated; an SOS switch disposed in a position accessible to an automobile occupant, the SOS switch configured to output a SOS switch signal in response to being actuated by the automobile occupant; a parking brake switch that operates a parking brake of the automobile, the parking brake switch configured to output a parking brake signal that reflects an operation state of the parking brake switch; a brake system configured to slow a movement of the automobile that is running; and a braking controller that is electrically connected to the driver incapacitation determination system, the SOS switch, the parking brake switch, and the brake system, wherein the braking controller includes circuitry configured to determine whether the driver is incapacitated based on a state of the driver incapacitation signal, control the brake system so the automobile decelerates at a first deceleration under a first condition, the first condition being that the parking brake switch is turned on by the occupant regardless of a result of the determination as to whether the driver is incapacitated and regardless of a state of the SOS switch signal while the automobile runs, control the brake system so that the automobile decelerates at a second deceleration that is smaller than the first deceleration under a second condition, the second condition being that the parking brake signal indicates the parking brake switch is not turned on and the driver incapacitation signal indicates the driver of the automobile is incapacitated regardless of the state of the SOS switch as indicated by the SOS switch signal while the automobile runs, and control the brake system so that the automobile decelerates at a third deceleration that is smaller than the first deceleration under a third condition, the third condition being that the SOS switch signal indicates the SOS switch is turned on, the parking brake signal indicates the parking brake switch is changed from on to off, and the driver incapacitation signal indicates the driver of the automobile is not incapacitated while the automobile runs.

According to the second aspect, the automobile can be decelerated at the first deceleration, the second deceleration, or the third deceleration by the signal output from the driver incapacitation determination system, an operation of the SOS switch by the occupant, or an output from the parking brake switch.

When the occupant turns on the parking brake switch, the automobile can be decelerated at the first deceleration which is the largest regardless of an operation of the SOS switch. After that, when the parking brake is turned off, if the SOS switch has been turned on once, the automobile can be decelerated at the third deceleration, which is smaller than the first deceleration.

As described above, the occupant other than the driver can select the deceleration suited to the surrounding traffic conditions and decelerate the automobile by using the SOS switch and the parking brake switch and can continue the deceleration even after releasing the parking brake switch to off.

In addition, when the driver is determined to be incapacitated, the automobile is decelerated at the second deceleration, which is smaller than the first deceleration. The system can stop the running automobile properly.

The driver incapacitation determination system according to the second aspect may include a head monitor that is installed in an interior of the automobile and constantly measures a head position of the driver, and the braking controller may calculate a deviation between the head position of the driver at start of operation and a current head position based on the signal output from the head monitor and, when the deviation is not less than a threshold, determine that the driver is incapacitated.

The driver incapacitation determination system described above can sense that the posture of the driver has changed based on the deviation of the head position of the driver. With this, the braking controller can determine whether the driver is incapacitated based on the driver's posture change, which is often seen when the driver is incapacitated.

In addition, the driver incapacitation determination system according to the second aspect may include a torque sensor that detects torsion deformation of a steering shaft of the automobile, and the braking controller may determine that the driver is incapacitated when a state in which the torsion deformation of the steering shaft is less than a threshold continues for a certain period of time.

The driver incapacitation determination system described above can sense the non-operation state of the steering based on the torsion deformation of the steering shaft that accompanies a steering operation. With this, the braking controller can determine whether the driver is incapacitated based on the non-operation state of the steering even if the driver loses consciousness while keeping the appropriate posture.

In addition, the driver incapacitation determination system according to the second aspect may include a camera that captures a face including both eyes of the driver of the automobile, and the braking controller may determine that the driver is incapacitated when a ratio of an eye opening time within a certain period of time is less than a predetermined ratio based on a signal output from the camera.

The driver incapacitation determination system described above can sense that the driver loses consciousness based on the opening degree of the eyes of the driver. With this, the braking controller sense that the driver is incapacitated based on the unconsciousness state of the driver when the driver is unconscious but some driving signal continues to be sent to the automobile during, for example, sleep-deprived zigzag driving.

Advantages

As described above, in the method for controlling an automobile and the automobile system according to the present disclosure, when the driver is incapacitated, the passenger can safely decelerate and stop the automobile in accordance with the surrounding traffic conditions without heavily burdening the passenger.

MODES FOR CARRYING OUT THE DISCLOSURE

Figure 1:
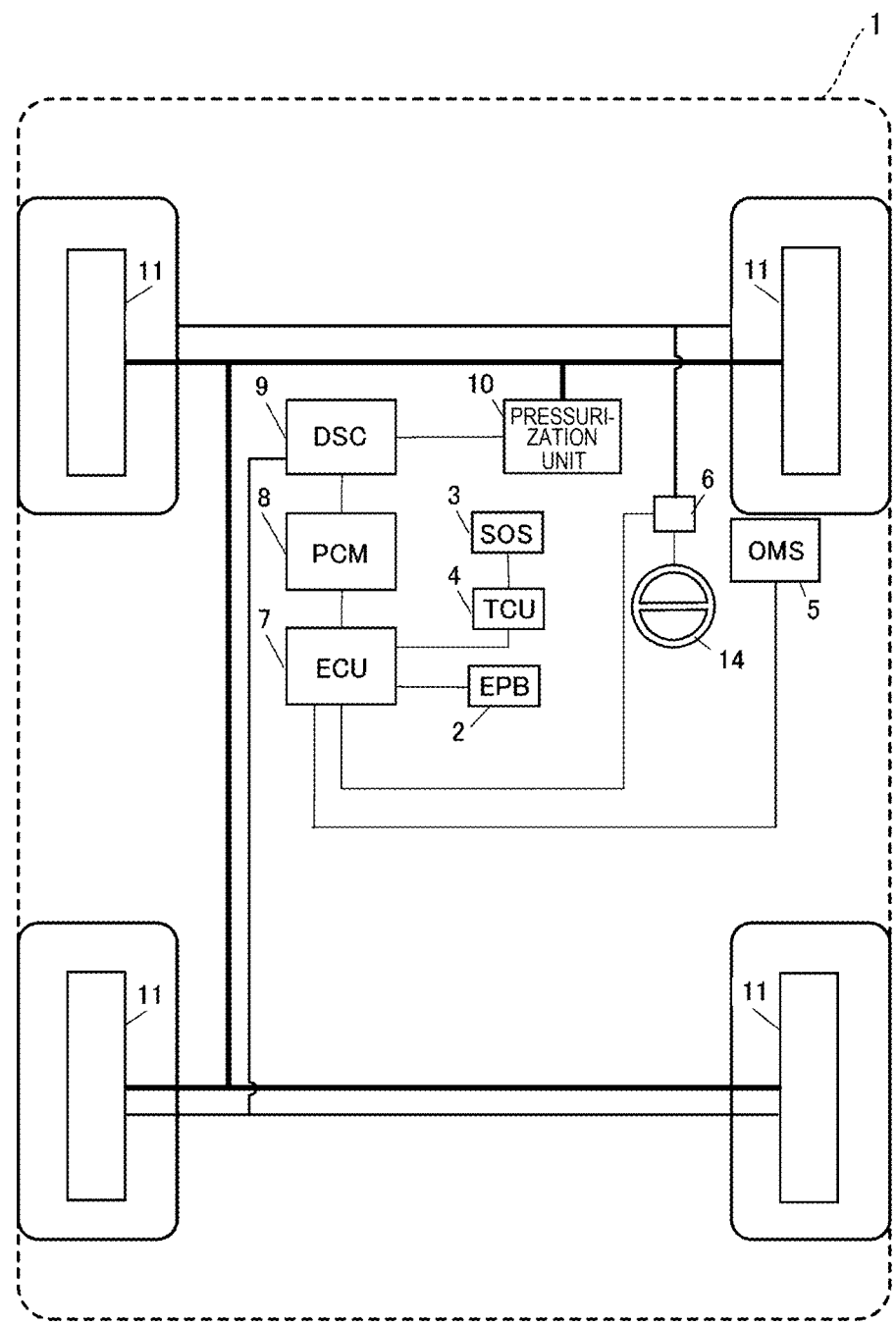
FIG. 1 is a block diagram illustrating the entire structure of an automobile equipped with a braking control system according to an embodiment of the present disclosure.
Figure 2:
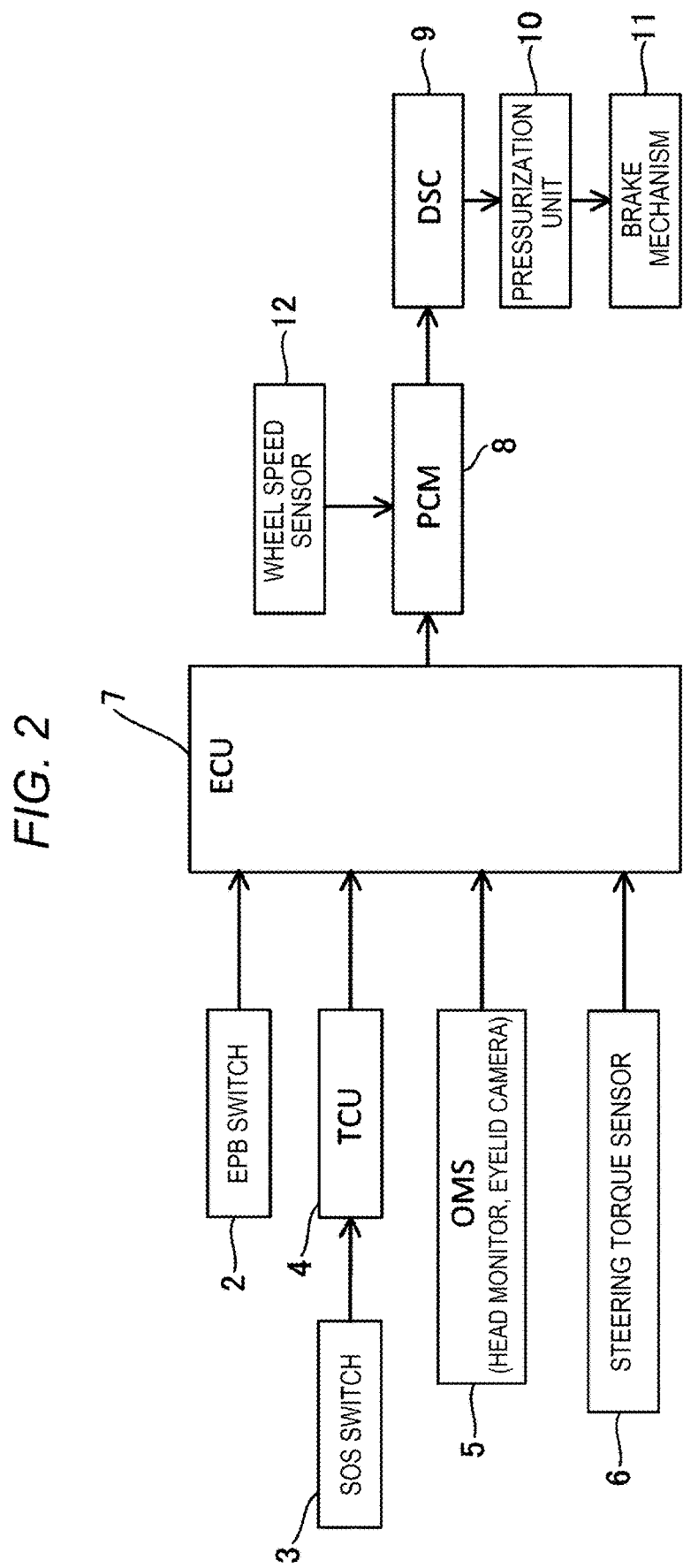
FIG. 2 is a block diagram illustrating the electrical structure of the braking control system according to the embodiment of the present disclosure.

FIG. 1 and FIG. 2 illustrate an automobile equipped with a braking control system according to an embodiment of the present disclosure, in which reference numeral 1 indicates an automobile body, reference numeral 2 indicates an EPB switch, reference numeral 3 indicates an SOS switch, reference numeral 4 indicates a telematics communication unit (TCU), reference numeral 5 indicates an occupant monitoring system (OMS), reference numeral 6 indicates a steering torque sensor, reference numeral 7 indicates an electro control unit (ECU), reference numeral 8 indicates a powertrain control module (PCM), reference numeral 9 indicates a dynamic stability control (DSC) unit, reference numeral 10 indicates a pressurization unit, and reference numeral 11 indicates a brake mechanism. The control circuitry (e.g., ECU, DSC, TCU, etc.) and algorithms described herein may be performed by the circuitry (processor-based circuitry and/or dedicated hardware based circuitry) like that described later with respect to FIG. 10.

Figure 3:
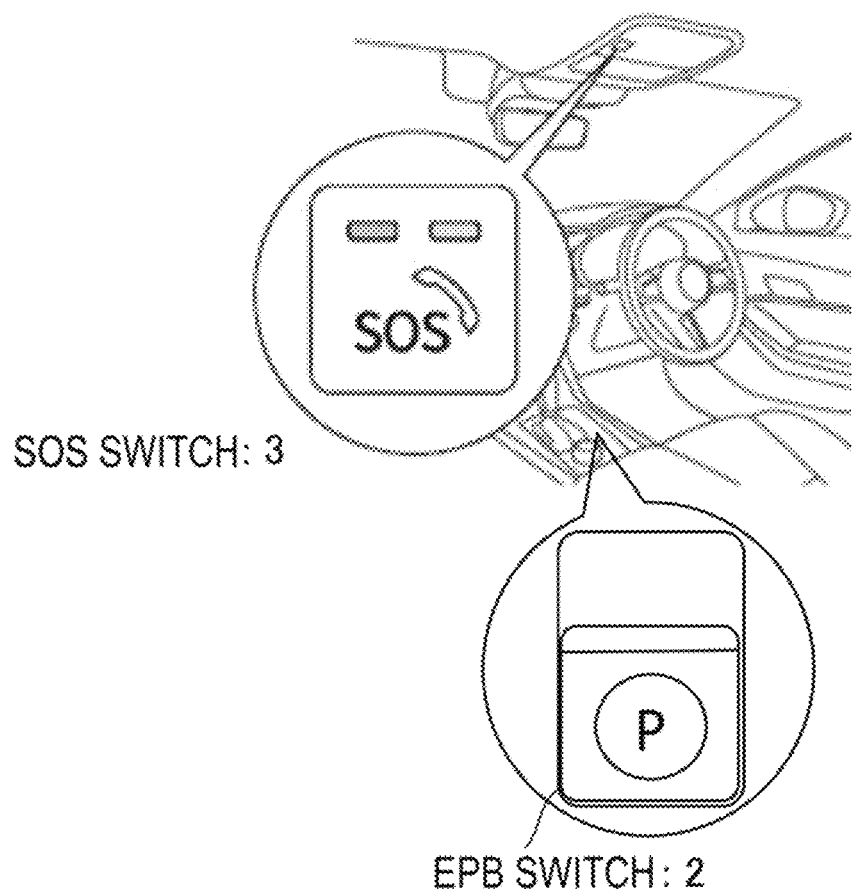
FIG. 3 illustrates the positions of an EPB switch and an SOS switch installed in the automobile.

As illustrated in FIG. 3, which in this non-limiting example has the steering wheel on the right side of the automobile, the EPB switch 2 is disposed at a position on a center console accessible to an occupant other than the driver. The EPB switch 2 is turned on when pulled up from the neutral position. The EPB switch 2 returns to the neutral position and is turned off when released. When the EPB switch 2 is turned on while the automobile stops, the parking brake is applied and only the rear wheels are locked, and the parking brake remains applied even after the EPB switch 2 is released and returns to the neutral position. When the EPB switch 2 is pushed down, the parking brake is released. When the EPB switch 2 is pulled up and turned on while the automobile runs, the hydraulic brake is applied and all wheels are locked while the EPB switch 2 is on. When the EPB switch 2 having been pulled up is released and the EPB switch 2 is turned off (that is, returned to the neutral position) from on, the hydraulic brake is released in principle. It should be noted that the operation of the EPB switch 2 while the automobile runs will be described in detail later.

As illustrated in FIG. 3, the SOS switch 3 is disposed at a position near the rear-view mirror accessible to the occupant other than the driver. The SOS switch 3 is a push button switch. When the occupant presses this button, the TCU 4 receives a signal, makes emergency automatic notification, and outputs a signal indicating that the SOS switch 3 has been operated to the ECU 7.

The OMS 5 includes a head monitor and an eyelid camera. Although not illustrated, the head monitor and the eyelid camera are disposed in front of the driver's seat and constantly measure the behavior of the driver. The head monitor measures the head position of the driver and the eyelid camera captures the face of the driver including both eyes. The OMS 5 measures the degree of opening of both eyes of the driver, that is, the eye opening degree, based on the signal output from the eyelid camera.

The steering torque sensor 6 is attached to the steering shaft interposed between the steering wheel 14 and the front wheels and constantly measures the torsion deformation of the steering shaft caused by a steering operation and an input from the front wheels.

As illustrated in FIG. 2, the ECU 7 is electrically connected so that the ECU 7 can receive inputs from the EPB switch 2, the TCU 4, the OMS 5, and the steering torque sensor 6 and output a signal to the PCM 8. Specifically, in accordance with a set program, the ECU 7 determines whether the driver is incapacitated based on the inputs from the EPB switch 2, the SOS switch 3 through the TCU 4, the OMS 5, and the steering torque sensor 6, determines the target deceleration, and outputs the determined target deceleration to the PCM 8.

The PCM 8 calculates the difference between the target deceleration input from the ECU 7 and the acceleration or the deceleration obtained from a change in the speed that is constantly input from the wheel speed sensor 12 illustrated only in FIG. 2 and the deceleration that can be output by engine braking, and outputs the calculation result to the DSC unit 9 as the necessary deceleration.

The DSC unit 9 calculates the hydraulic pressure required to achieve the required deceleration input from the PCM 8 and outputs the calculated hydraulic pressure to the pressurization unit 10. It should be mentioned, while the term "unit" is used herein, processor-based or dedicated hardware circuitry performs any calculation and data manipulation operations, as well as generation of control signals.

The pressurization unit 10 adjusts the valve and the pump based on the input from the DSC unit 9 and causes the brake mechanisms 11 provided on the wheels to generate the hydraulic pressure through the hydraulic pipe illustrated by the thick solid lines in FIG. 1. This hydraulic pressure operates the brake mechanisms 11 and generates a braking force.

Although not illustrated in detail, each of the brake mechanisms 11 includes a rotor disc mounted on a wheel, a caliper disposed across the inside and the outside of the rotor disc, an inner brake pad and an outer brake pad disposed so as to sandwich the rotor disc therebetween inside the caliper, a cylinder connected to the hydraulic pipe, and a piston fitted into the cylinder. When the hydraulic pressure is transmitted from the hydraulic pipe, the hydraulic pressure moves the piston in the cylinder and pushes the inner brake pad against the rotor disc. Since the caliper moves toward the inside of the vehicle due to a reaction force at this time, the outer brake pad is also pushed against the rotor disc. This causes the rotor disc to be sandwiched between two brake pads, generates a braking force on the wheel, and decelerates the vehicle 1.

The pressurization unit 10 also supplies the hydraulic pressure to the brake mechanisms 11 of the wheels when the driver depresses a brake pedal (not illustrated). The braking force corresponding to the operation by the driver is given to the automobile.

The DSC unit 9 also operates the parking brakes of the rear wheels by outputting an electric signal to the brake mechanisms 11 of the rear wheels when the EPB switch 2 is turned on while the automobile stops.

Next, braking control by the ECU 7 will be described with reference to the flowchart in FIG. 4. The ECU 7 performs braking control that decelerates and stops the automobile when the driver becomes incapacitated while the automobile runs. The ECU 7 also decelerates and stops the automobile when the driver or the passenger who is an occupant operates the EPB switch 2 or operates the EPB switch 2 and the SOS switch 3 while the automobile runs.

In step S1, the ECU 7 determines whether the automobile is running. When the automobile is running, the process proceeds to step S2.

In step S2, the ECU 7 reads the ON/OFF state of the EPB switch 2.

In step S3, the ECU 7 reads whether the SOS switch 3 has been turned on. It should be noted that the ECU 7 determines that the SOS switch 3 has been turned on if the SOS switch 3 has been pressed once from when the driver of the automobile turns on the start switch concerning the start of the automobile to when the driver turns off the start switch.

In step S4, the ECU 7 determines whether the driver is incapacitated based on the measurement signal of the OMS 5 and the measurement signal of the steering torque sensor 6.

Figure 4:
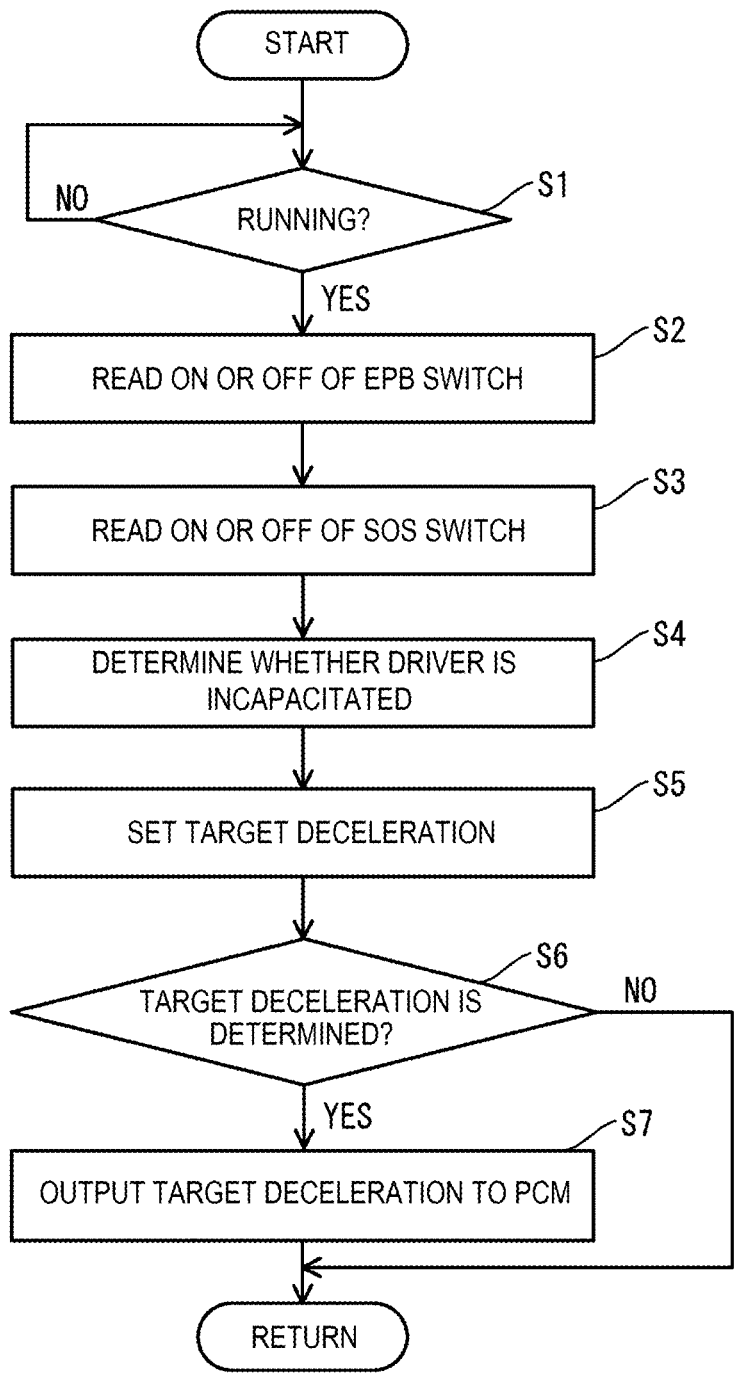
FIG. 4 is a flowchart illustrating control by an ECU.
Figure 5:
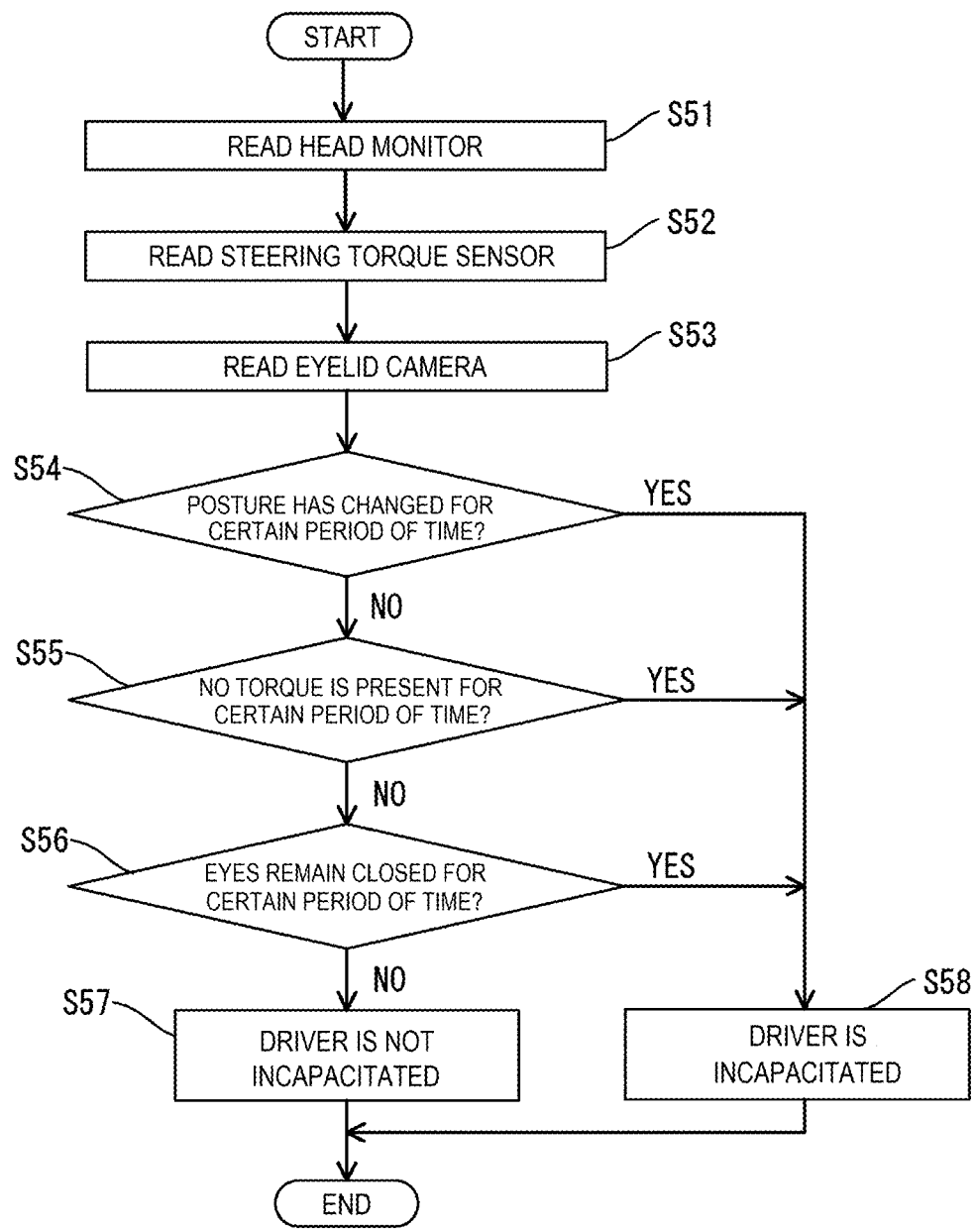
FIG. 5 is a flowchart illustrating control for determining whether a driver is incapacitated.

FIG. 5 illustrates, in detail, the steps of determining whether the driver is incapacitated in step S4 in FIG. 4. First, in step S51, the ECU 7 reads the posture of the driver measured by the head monitor from the OMS 5 and calculates the deviation between the head position of the driver at the start of operation and the current head position. When the deviation is not less than the threshold, the ECU 7 determines that the posture of the driver has changed.

In step S52, the ECU 7 reads the presence or absence of a steering operation from the steeling torque sensor 6. When the torsion deformation of the steering shaft is less than the threshold, the ECU 7 determines that a steering operation is absent.

In step S53, the ECU 7 reads whether the eyes of the driver are open, that is, the eye opening degree of the driver based on the signal output from the eyelid camera.

In step S54, the ECU 7 determines whether the posture of the driver has changed for more than a certain period of time based on the information in step S51. The process proceeds to step S58 in the case of YES or the process proceeds to step S55 in the case of NO.

In step S55, the ECU 7 determines whether the driver performs no steering operation for a certain period of time based on the information in step S52. The process proceeds to step S58 in the case of YES or the process proceeds to step S56 in the case of NO.

In step S56, the ECU 7 determines whether the ratio of the time for which the eyes of the driver are open within a certain period of time is less than a predetermined ratio, that is, determines whether the eyes of the driver are closed for a certain period of time based on the information in step S53. The process proceeds to step S58 in the case of YES or the process proceeds to step S57 in the case of NO.

In step S57, the ECU 7 determines that the driver is not incapacitated and the process returns to the flowchart in FIG. 4.

In step S58, the ECU 7 determines that the driver is incapacitated and the process returns to the flowchart in FIG. 4.

After the process returns to the flowchart in FIG. 4, the ECU 7 sets the target deceleration of the automobile in braking control in step S5, which follows step S4.

Figure 6:
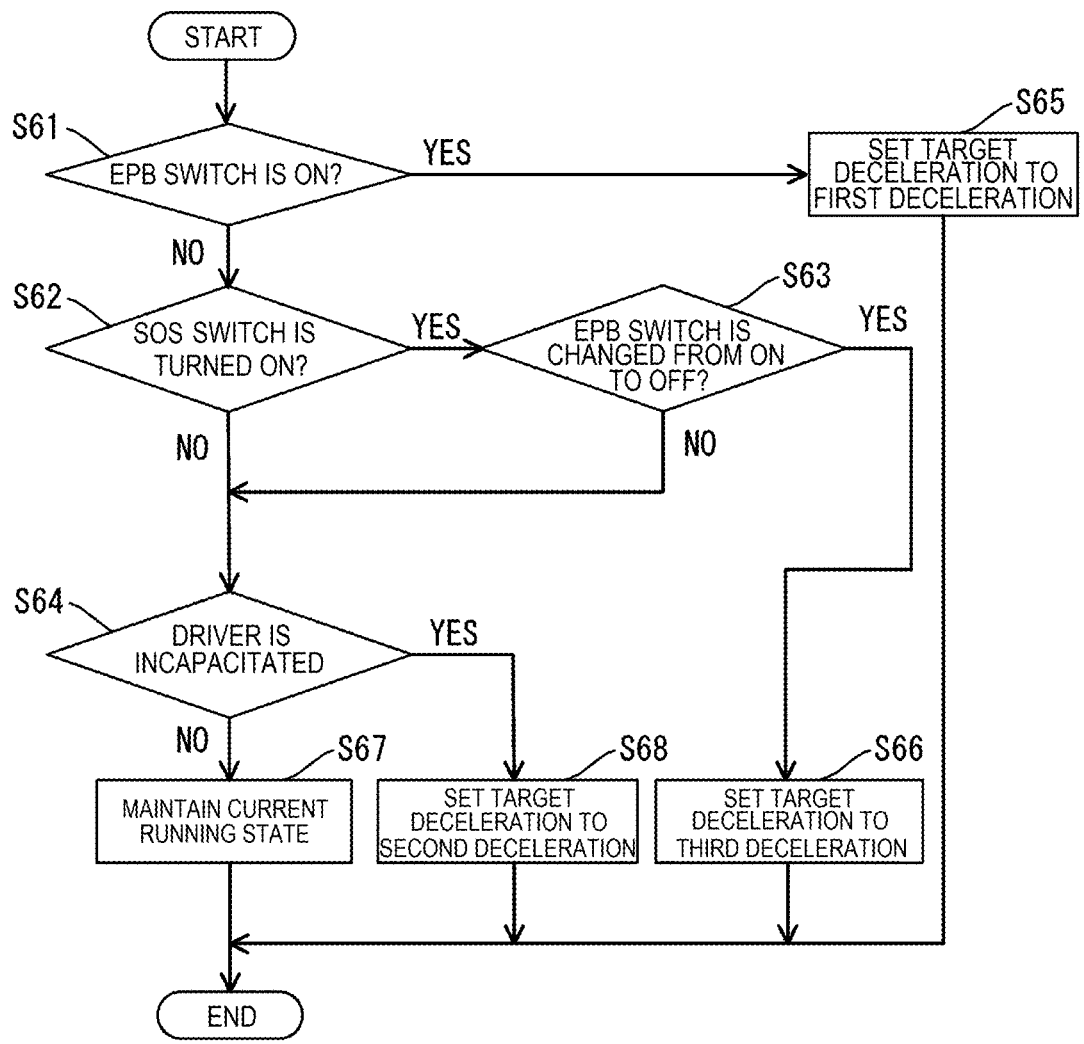
FIG. 6 is a flowchart illustrating control for determining a target deceleration.

FIG. 6 illustrates, in detail, the step of setting the target deceleration in step S5 in FIG. 4. In step S61, the ECU 7 determines whether the EPB switch 2 is on based on the information in step S1 in FIG. 4. The process proceeds to step S65 in the case of YES or the process proceeds to step S62 in the case of NO.

In step S62, the ECU 7 determines whether the SOS switch 3 has been turned on based on the information in step S2 in FIG. 4. The process proceeds to step S63 in the case of YES or the process proceeds to step S64 in the case of NO.

In step S63, the ECU 7 determines whether the EPB switch 2 has been changed from on to off based on the information in step S1 in FIG. 4. The process proceeds to step S66 in the case of YES or the process proceeds to step S64 in the case of NO.

In step S64, the ECU 7 determines whether the driver is incapacitated based on the information in steps S57 and S58 in FIG. 5. The process proceeds to step S68 in the case of YES or the process proceeds to step S67 in the case of NO.

In step S65, the target deceleration is determined to be the first deceleration.

In step S66, the target deceleration is determined to be the third deceleration, which is smaller than the first deceleration. In step S68, the target deceleration is determined to be the second deceleration, which is smaller than the first deceleration. The third deceleration may be larger or smaller than the second deceleration. The second deceleration and the third deceleration can be set as appropriate.

In step S67, the current running state is maintained. That is, the target deceleration is determined to be zero.

After step S65, S66, S67, or S68, the process returns to the flowchart in FIG. 4.

After the process returns to the flowchart in FIG. 4, in step S6 which follows step S5, the ECU 7 determines whether the target deceleration has been determined based on the information in step S65, step S66, step S67, or step S68 in FIG. 6. The process proceeds to step S7 in the case of YES or the process performs a return in the case of NO.

In step S7, the ECU 7 outputs the information of the determined target deceleration to the PCM 8 and performs a return. After receiving the information of the target deceleration, the PCM 8 applies a braking force to the automobile through the DSC unit 9, the pressurization unit 10, and the brake mechanism 11. The automobile decelerates at the set target deceleration.

Next, the decelerations to be generated by specific operations by the passenger (or the driver) will be described with reference to the time charts in FIGS. 7 to 9.

Figure 7:
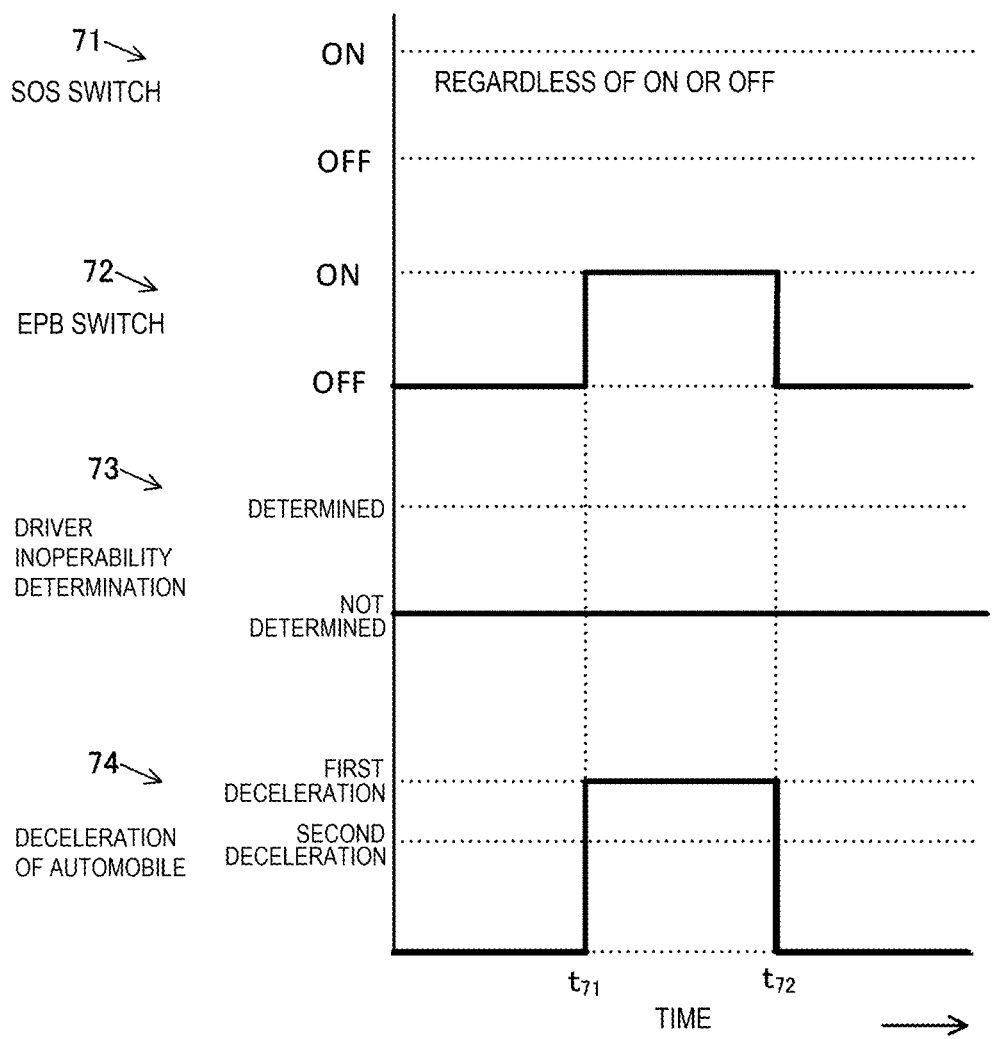
FIG. 7 is a time chart illustrating the braking force in a first deceleration step.

First, while the occupant turns on the EPB switch 2 (from time $t_{71}$ to time $t_{72}$) as illustrated in chart 72 in FIG. 7, deceleration is performed at the first deceleration (first deceleration step, see chart 74). In this case, as illustrated in chart 71, it does not matter whether the occupant operates the SOS switch 3. In addition, as illustrated in chart 73, it also does not matter whether the driver is incapacitated. It should be noted that the driver is not determined to be incapacitated in the example in FIG. 7.

The first deceleration is higher than the second deceleration. The occupant can stop the running automobile immediately by turning on the EPB switch 2 regardless of whether the occupant operates the SOS switch 3.

That is, while the occupant turns on the EPB switch 2, the intention of the occupant to stop the running automobile is clear. By decelerating the automobile at the first deceleration in accordance with the intention of the occupant, the running automobile can be stopped immediately. Alternatively, when the occupant has changed the EPB switch 2 from on to off, it is considered that the intention of the occupant to stop the running automobile has been lost. By stopping the deceleration of the automobile in accordance with the intention of the occupant, the automobile can be safely driven in accordance with the surrounding traffic conditions.

It should be noted that the first deceleration step is the process of shifting from step S61 to step S65 in the flowchart in FIG. 6.

Figure 8:
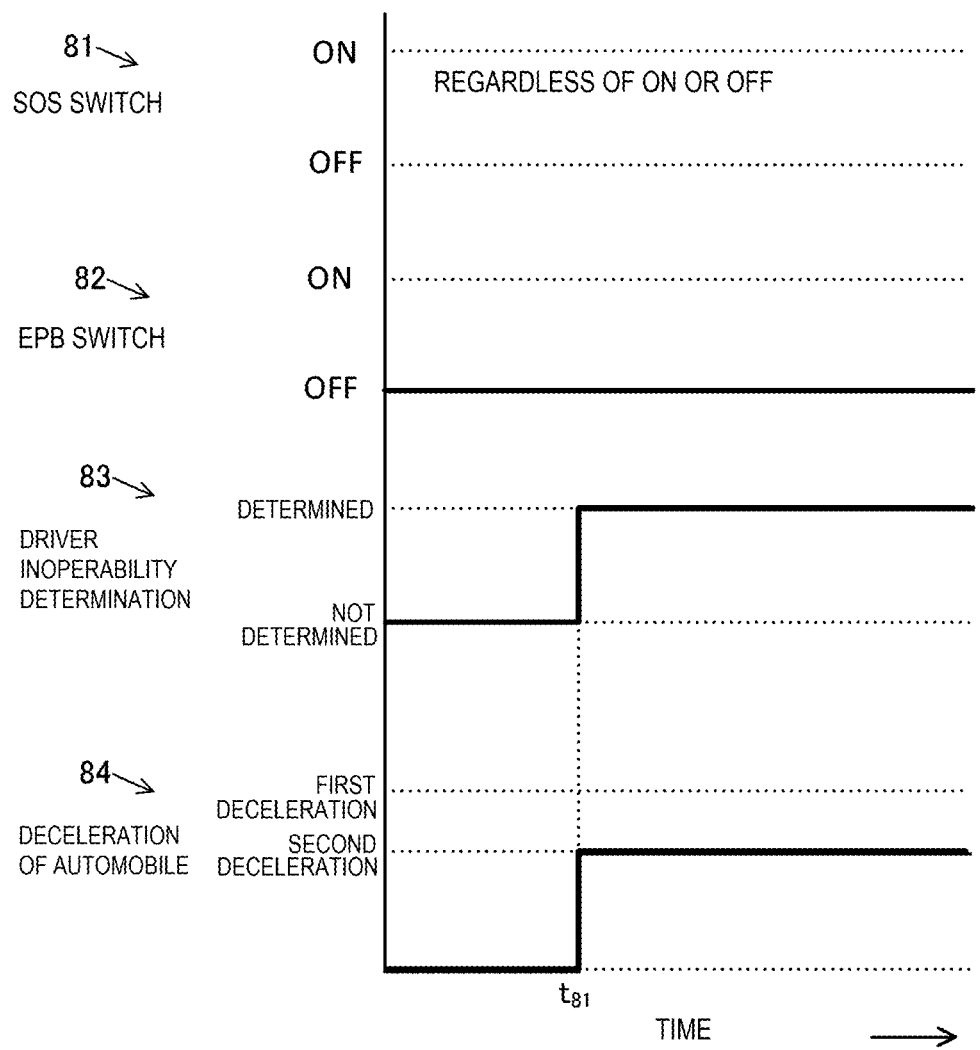
FIG. 8 is a time chart illustrating the braking force in a second deceleration step.

Next, when the occupant does not operate the EPB switch 2 as illustrated in chart 82 in FIG. 8 and the driver is determined to be incapacitated as illustrated in chart 83 (at time $t_{81}$), the automobile decelerates at the second deceleration, which is smaller than the first deceleration (second deceleration step, see chart 84). In this case, it does not matter whether the occupant operates the SOS switch 3. The automobile decelerates regardless of whether the occupant operates the SOS switch 3. Since the occupant does not turn on the EPB switch 2, the intention of the occupant to stop the running automobile is not clear. On the other hand, since the system determines that the driver is incapacitated, the automobile is preferably stopped. Since the system stops the automobile at the second deceleration, which is relatively low, the automobile can be safely stopped in accordance with the surrounding traffic conditions.

It should be noted that the second deceleration step is the process of shifting from step S61 to steps S62, S64, and S68 and the process of shifting from step S61 to steps S62, S63, S64, and S68 in the flowchart in FIG. 6.

Figure 9:
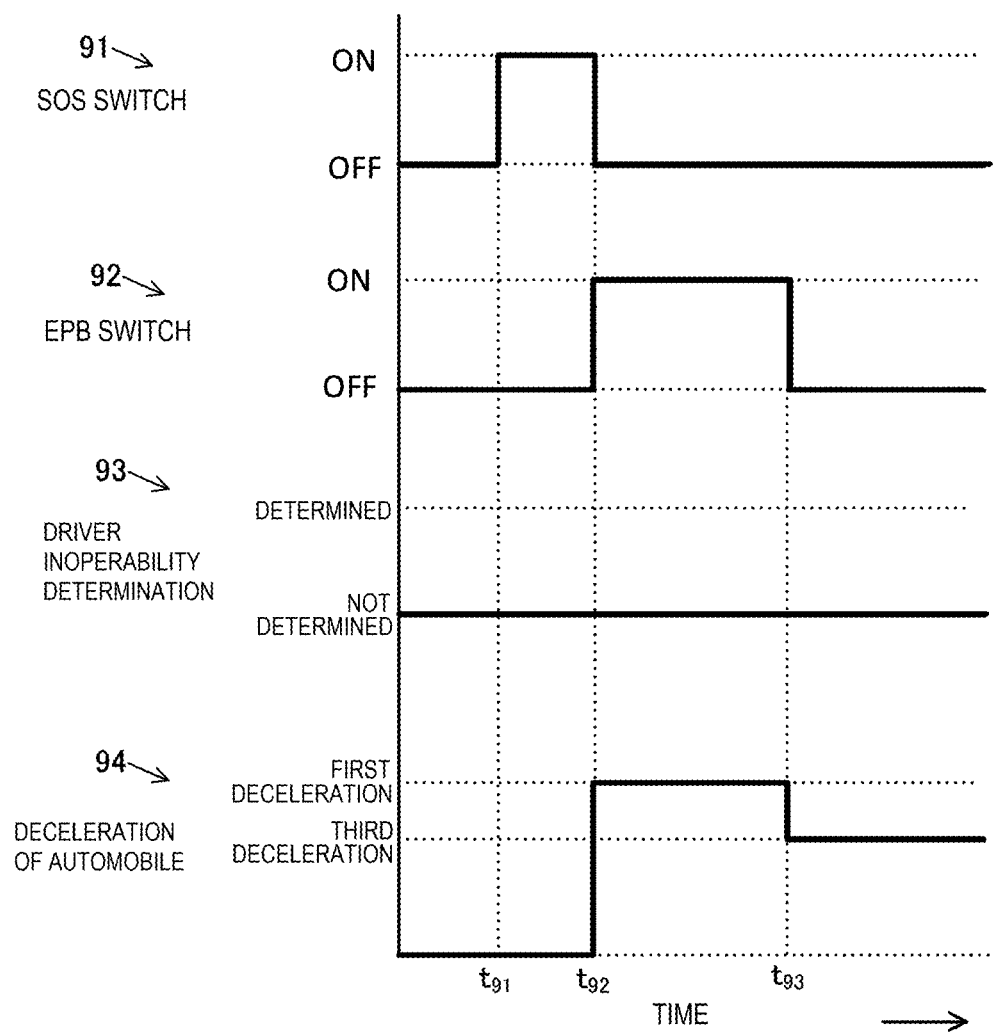
FIG. 9 is a time chart illustrating the braking force in a third deceleration step.

Next, it is assumed that the occupant operates the SOS switch 3 in advance at time $t_{91}$ as illustrated in chart 91 in FIG. 9. After that, when the occupant turns on the EPB switch 2 at time $t_{92}$ as illustrated in chart 92, the system decelerates the automobile at the first deceleration as in FIG. 7 (see chart 94). After that, when the occupant turns off the EPB switch 2 at time $t_{93}$, the system performs deceleration at the third deceleration unlike in FIG. 7 (third deceleration step, see chart 94). It should be noted that the driver is not determined to be incapacitated in the example in FIG. 9.

While the occupant turns on the EPB switch 2, the intention of the occupant to stop the running automobile is clear as in the first deceleration step, and the running automobile can be immediately stopped by decelerating the automobile at the first deceleration in accordance with the intention of the occupant. In addition, when the occupant changes the EPB switch 2 from on to off, the intention of the occupant to stop the running automobile is not clear, but some emergency may have occurred in the running automobile because the SOS switch 3 has been operated, and it is safer to stop the vehicle immediately. The third deceleration step is different from the first deceleration step in that the automobile is decelerated at the third deceleration, which is relatively small, after the EPB switch 2 is changed from on to off. This can safely stop the automobile in accordance with the surrounding traffic conditions.

It should be noted that the third deceleration step is the process of shifting from step S61 to steps S62, S63, and S66 in the flowchart in FIG. 6.

As described above, the braking control system decelerates the automobile at different decelerations depending on the combination of operations of the EPB switch 2 and the SOS switch 3 and the result of determination as to whether the driver is incapacitated. This can stop the running automobile properly under various circumstances.

In addition, in this braking control system, the switch operated by the occupant is EPB switch 2 or the SOS switch 3. Both the EPB switch 2 and the SOS switch 3 are disposed at positions accessible to the driver and the passenger or the like seated next to the driver. Even if the driver is incapacitated, the passenger can safely stop the automobile in accordance with the surrounding traffic conditions by operating the EPB switch 2 and/or the SOS switch 3. In addition, the EPB switch 2 also functions as the switch for the parking brake and the SOS switch 3 also functions as the switch for emergency automatic notification. The braking control system can achieve the braking control described above without providing a new switch. Advantageously, the occupants can easily learn the operation because the number of switches does not increase unnecessarily.

It should be noted that the occupant turns on the SOS switch 3 and then turns on the EPB switch 2 in the third deceleration step illustrated in FIG. 9, but the order of the operations of the SOS switch 3 and the EPB switch 2 is not limited to this. For example, the occupant may turn on the SOS switch 3 while turning on the EPB switch 2. In this case, when the occupant changes the EPB switch 2 from on to off, the braking control system may decelerate the automobile at the third deceleration.

In addition, it is assumed that, for example, the occupant turns on the EPB switch 2 to decelerate the automobile at the first deceleration and the occupant changes the EPB switch 2 from on to off to stop the deceleration of the automobile (that is, the first deceleration step). After that, when the occupant turns on the SOS switch 3, the occupant may restart the deceleration of the automobile at the third deceleration without turning on the EPB switch 2.

In addition, the third deceleration may be the same as the second deceleration. That is, in the third deceleration step, the automobile may be decelerated at the second deceleration that is the same as in the second deceleration step.

Figure 10:
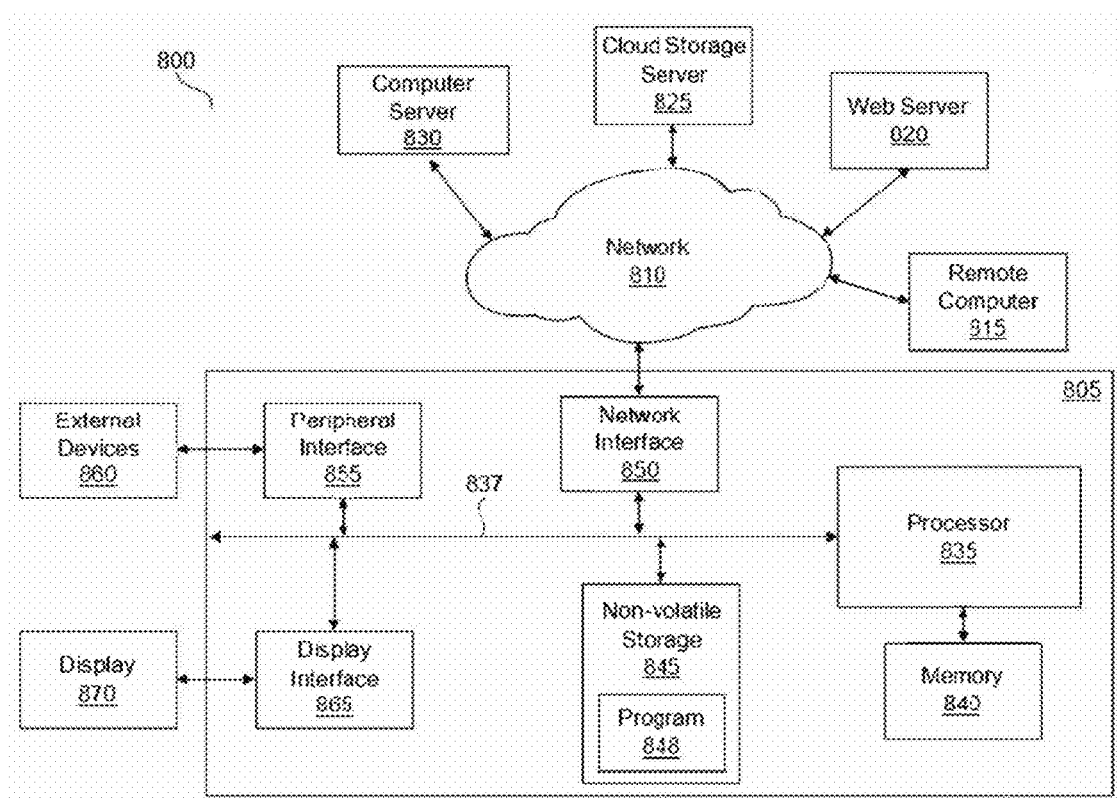
FIG. 10 is a diagram of computer (including circuitry) and a network architecture of computer-based control circuitry according to the embodiments.

FIG. 10 illustrates a block diagram of a computer that may implement the various embodiments described herein.

The present disclosure may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 10 is a functional block diagram illustrating a networked system 800 of one or more networked computers and servers. In an embodiment, the hardware and software environment illustrated in FIG. 10 may provide an exemplary platform for implementation of the software and/or methods according to the present disclosure.

Referring to FIG. 10, a networked system 800 may include, but is not limited to, computer 805, network 810, remote computer 815, web server 820, cloud storage server 825 and computer server 830. In some embodiments, multiple instances of one or more of the functional blocks illustrated in FIG. 10 may be employed.

Additional detail of computer 805 is shown in FIG. 10. The functional blocks illustrated within computer 805 are provided only to establish exemplary functionality and are not intended to be exhaustive. And while details are not provided for remote computer 815, web server 820, cloud storage server 825 and computer server 830, these other computers and devices may include similar functionality to that shown for computer 805.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random. Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and computer server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and computer server 830.

DESCRIPTION OF REFERENCE SIGNS AND NUMERALS

2: EPB switch (parking brake switch)
3: SOS switch
5: OMS (incapacitation determination system, head monitor, eyelid camera)
6: steering torque sensor (incapacitation determination system)
7: ECU (braking controller)
11: brake mechanism (braking mechanism)

The invention claimed is:

1. A method for controlling an automobile, comprising:
based on input from one or more sensors, determining with circuitry whether a driver of an automobile is incapacitated;
determining with the circuitry whether an SOS switch is turned on by an automobile occupant, the SOS switch being disposed at a position accessible to the automobile occupant;
detecting with the circuitry an operation state set by the automobile occupant of a parking brake switch that operates a parking brake of the automobile;
decelerating the automobile using a brake by a first deceleration amount under a first condition, the first condition occurring in response to a detection being made that the parking brake switch is turned on regardless of whether the driver is determined as being incapacitated and regardless of whether the SOS switch is turned on while the automobile runs;
decelerating the automobile using the brake by a second deceleration amount that is smaller than the first deceleration amount under a second condition, the second condition being that the parking brake switch is not detected as turned on and the driver is determined as being incapacitated regardless of whether the SOS switch is determined as being on while the automobile runs; and
decelerating the automobile using the brake by a third deceleration amount that is smaller than the first deceleration amount under a third condition, the third condition being that it is determined that the SOS switch is turned on, the parking brake switch is changed from on to off, and it is not determined that the driver is incapacitated while the automobile runs.

2. The method for controlling an automobile according to claim 1, wherein
the determining whether the driver is incapacitated includes
measuring a head position of the driver,
calculating with the circuitry a deviation between the head position of the driver at start of automobile operation and a current head position of the driver, and
determining that the driver is incapacitated under a condition in which the deviation is calculated to be not less than a threshold.

3. The method for controlling an automobile according to claim 2, wherein
the determining whether the driver is incapacitated includes
detecting torsion deformation of a steering shaft of the automobile, and
determining that the driver is incapacitated under a condition in which the torsion deformation of the steering shaft is less than a threshold and the torsion deformation continues for a certain period of time.

4. The method for controlling an automobile according to claim 2, wherein
the determining whether the driver is incapacitated includes
measuring an eye opening degree of the driver, and
determining that the driver is incapacitated under a condition in which a ratio of an eye opening time within a certain period of time is less than a predetermined ratio based on the measured eye opening degree.

5. The method for controlling an automobile according to claim 1, wherein
the determining whether the driver is incapacitated includes
detecting torsion deformation of a steering shaft of the automobile, and
determining that the driver is incapacitated under a condition in which the torsion deformation of the steering shaft is less than a threshold and the torsion deformation continues for a certain period of time.

6. The method for controlling an automobile according to claim 5, wherein
the determining whether the driver is incapacitated includes
measuring an eye opening degree of the driver, and
determining that the driver is incapacitated under a condition in which a ratio of an eye opening time within a certain period of time is less than a predetermined ratio based on the measured eye opening degree.

7. The method for controlling an automobile according to claim 1, wherein
the determining whether the driver is incapacitated includes
measuring an eye opening degree of the driver, and
determining that the driver is incapacitated under a condition in which a ratio of an eye opening time within a certain period of time is less than a predetermined ratio based on the measured eye opening degree.

8. An automobile system comprising:
a driver incapacitation determination system that outputs a driver incapacitation signal measured to determine whether a driver of an automobile is incapacitated;
an SOS switch disposed in a position accessible to an automobile occupant, the SOS switch configured to output a SOS switch signal in response to being actuated by the automobile occupant;
a parking brake switch that operates a parking brake of the automobile, the parking brake switch configured to output a parking brake signal that reflects an operation state of the parking brake switch;
a brake system configured to slow a movement of the automobile that is running; and
a braking controller that is electrically connected to the driver incapacitation determination system, the SOS switch, the parking brake switch, and the brake system,
wherein the braking controller includes circuitry configured to
determine whether the driver is incapacitated based on a state of the driver incapacitation signal,
control the brake system so that the automobile decelerates at a first deceleration under a first condition, the first condition being that the parking brake switch is turned on by the occupant regardless of a result of the determination as to whether the driver is incapacitated and regardless of a state of the SOS switch signal while the automobile runs,
control the brake system so that the automobile decelerates at a second deceleration that is smaller than the first deceleration under a second condition, the second condition being that the parking brake signal indicates the parking brake switch is not turned on and the driver incapacitation signal indicates the driver of the automobile is incapacitated regardless of the state of the SOS switch as indicated by the SOS switch signal while the automobile runs, and
control the brake system so that the automobile decelerates at a third deceleration that is smaller than the first deceleration under a third condition, the third condition being that the SOS switch signal indicates the SOS switch is turned on, the parking brake signal indicates the parking brake switch is changed from on to off, and the driver incapacitation signal indicates the driver of the automobile is not incapacitated while the automobile runs.

9. The automobile system according to claim 8,
wherein the driver incapacitation determination system includes a head monitor that is installed in an interior of the automobile and constantly measures a head position of the driver, and
the circuitry calculates a deviation between the head position of the driver at a start of automobile operation and a current head position based on a signal output from the head monitor, and under a condition that the deviation in head position is not less than a threshold, determines that the driver is incapacitated.

10. The automobile system according to claim 9, wherein
the driver incapacitation determination system further includes a torque sensor that detects torsion deformation of a steering shaft of the automobile, and
the circuitry determines that the driver is incapacitated under a condition that the torsion deformation of the steering shaft is less than a threshold continues for a certain period of time.

11. The automobile system according to claim 10,
wherein the driver incapacitation determination system further includes a camera that captures a face of the driver including both eyes of the driver, and
the circuitry is configured to output a signal indicating that the driver is incapacitated under a condition in which a ratio of an eye opening time within a certain period of time is less than a predetermined ratio based on an output from the camera.

12. The automobile system according to claim 9,
wherein the driver incapacitation determination system further includes a camera that captures a face of the driver including both eyes of the driver, and
the circuitry is configured to output a signal indicating that the driver is incapacitated under a condition in which a ratio of an eye opening time within a certain period of time is less than a predetermined ratio based on an output from the camera.

13. The automobile system according to claim 8,
wherein the driver incapacitation determination system further includes a torque sensor that detects torsion deformation of a steering shaft of the automobile, and
the circuitry determines that the driver is incapacitated under a condition that the torsion deformation of the steering shaft is less than a threshold continues for a certain period of time.

14. The automobile system according to claim 13,
wherein the driver incapacitation determination system further includes a camera that captures a face of the driver including both eyes of the driver, and
the circuitry is configured to output a signal indicating that the driver is incapacitated under a condition in which a ratio of an eye opening time within a certain period of time is less than a predetermined ratio based on an output from the camera.

15. The automobile system according to claim 8,
wherein the driver incapacitation determination system further includes a camera that captures a face of the driver including both eyes of the driver, and
the circuitry is configured to output a signal indicating that the driver is incapacitated under a condition in which a ratio of an eye opening time within a certain period of time is less than a predetermined ratio based on an output from the camera.

\* \* \* \* \*